United States Patent
Duits

(10) Patent No.: US 9,109,966 B2
(45) Date of Patent: Aug. 18, 2015

(54) TWO DIMENSION EXTERNAL FORCE SENSOR

(75) Inventor: Johannes Andrianus Maria Duits, Bodegraven (NL)

(73) Assignee: AKTIEBOLAGET SKF, Gothenburg (SE)

( * ) Notice: Subject to any disclaimer, the term of this patent is extended or adjusted under 35 U.S.C. 154(b) by 128 days.

(21) Appl. No.: 13/997,292

(22) PCT Filed: Jun. 7, 2011

(86) PCT No.: PCT/EP2011/002769
§ 371 (c)(1),
(2), (4) Date: Sep. 16, 2013

(87) PCT Pub. No.: WO2012/084069
PCT Pub. Date: Jun. 28, 2012

(65) Prior Publication Data
US 2014/0000385 A1    Jan. 2, 2014

Related U.S. Application Data

(60) Provisional application No. 61/426,102, filed on Dec. 22, 2010.

(51) Int. Cl.
*G01L 1/04* (2006.01)
*G01L 5/16* (2006.01)

(52) U.S. Cl.
CPC ... *G01L 5/16* (2013.01); *Y10T 29/53* (2015.01)

(58) Field of Classification Search
CPC .............. G01L 5/16; G01L 1/04; G01L 1/10; G01L 19/147; G01L 5/0004

USPC ............... 73/862.621, 862.625, 862.629, 73/862.637, 862.639, 862.046
See application file for complete search history.

(56) References Cited

U.S. PATENT DOCUMENTS

| | | | |
|---|---|---|---|
| 3,773,124 A | | 11/1973 | Bullivant |
| 3,994,161 A | * | 11/1976 | Trozera .................... 73/862.633 |
| 4,020,686 A | * | 5/1977 | Brendel ......................... 177/229 |
| 4,064,744 A | * | 12/1977 | Kistler ............................. 73/766 |
| 4,196,784 A | * | 4/1980 | Suzuki et al. ................. 177/211 |
| 4,454,770 A | * | 6/1984 | Kistler ..................... 73/862.633 |
| 4,522,066 A | * | 6/1985 | Kistler et al. .................... 73/781 |
| 4,655,306 A | * | 4/1987 | Saner ............................. 177/229 |
| 5,421,213 A | | 6/1995 | Okada |
| 6,318,184 B1 | * | 11/2001 | Kimerer, Jr. .................... 73/772 |

FOREIGN PATENT DOCUMENTS

| | | |
|---|---|---|
| DE | 102008029055 A1 | 12/2009 |
| DE | 202009003540 U1 | 7/2010 |

* cited by examiner

*Primary Examiner* — Max Noori
(74) *Attorney, Agent, or Firm* — Bryan Peckjian; SKF USA Inc. Patent Dept.

(57) ABSTRACT

A force sensor has an input part, a base part, an intermediate part and a sensor element. The external force to be sensed is applied to the input part. The input part transmits the external force to the base part via the intermediate part. The base part is fixed to a frame of reference and exerts a reaction force on the input part via the intermediate part. The intermediate part deforms as a result of the external force and the reaction force. The deformation of the intermediate part causes the input part to change its position or orientation relative to the base part. The sensor element senses this change and supplies an output signal representative of the change.

10 Claims, 8 Drawing Sheets

TWO DIMENSION EXTERNAL FORCE SENSOR

CROSS-REFERENCE TO RELATED APPLICATION

This application is a National Stage application claiming the benefit of International Application Number PCT/EP2011/002769 filed on 7 Jun. 2011, which claims the benefit of U.S. Provisional Patent Application 61/426,102, filed on 22 Dec. 2010.

FIELD OF THE INVENTION

The invention relates to a force sensor for sensing a force in at least two dimensions, and to a kit-of-parts for assembling a force sensor.

BACKGROUND ART

A force sensor, also referred to as a load cell, is well known in the art and is configured for sensing an attribute of a force, e.g., magnitude or direction, applied to a physical object. A force sensor is a transducer that supplies an output signal representative of an attribute (magnitude and/or direction) of the force exerted on the physical object. A force applied to a physical object shall generally cause the physical object to deform. The deformation is a result of pressure and stress within the physical object resulting from the physical object's inertia or from a reaction force applied to the physical object by the environment. The deformation can be measured in a variety of ways. For example, one or more strain gauges are attached to a surface of the physical object to sense the deformation of the physical object at the surface. As another example, the deformation of the surface of the physical object as a result of the force applied causes a change in distance and/or orientation between a specific location on the surface of the physical object and a reference location external to the physical object. The change in distance can be measured capacitively, optically, piezoelectrically, etc.

U.S. Pat. No. 5,421,213, incorporated herein by reference, discloses a multi-dimensional force detector. The known detector comprises a disk-shaped fixed substrate and a disk-shaped flexible substrate. The fixed substrate and the flexible substrate are attached to an inner wall of a cylindrical casing along their respective peripheral portions. The fixed substrate has a first surface that accommodates a disk-shaped fixed electrode. The flexible substrate has a second surface and a third surface. The second surface accommodates four displacement electrodes. Each of the four displacement electrodes is shaped as a quadrant of a disk or of a ring. The first surface and the second surface face each other. The fixed electrode and each respective one of the displacement electrodes form a respective capacitor. The third surface faces away from the fixed substrate and accommodates a cylindrical body positioned coaxially with the disk-shaped flexible substrate. Assume that the cylindrical casing is kept stationary and that an external force is applied on the cylindrical body. The flexible substrate deforms in response to the external force. The deformation of the flexible substrate is determined by the magnitude and direction of the external force, by the reaction forces exerted by the cylindrical casing on the flexible substrate along the peripheral portion of the flexible substrate, by the elastic properties of the material of the flexible substrate, and by the shape of the flexible substrate if no external force is being applied. The deformation gives rise to a respective change in the capacitance of the respective capacitor. Measuring the respective changes in the capacitances provides information about the direction and magnitude of the external force.

SUMMARY OF THE INVENTION

The inventor has realized that the known force detector has some drawbacks. For example, the external force and the reaction forces are applied directly on the flexible substrate that carries the displacement electrodes. A force applied to the cylindrical body causes the distance and orientation of the displacement electrodes to change relative to the fixed electrode. In addition, the external force causes the displacement electrodes curve in the axial direction. This gives rise to non-linearities in the change of the capacitances. These non-linearities have to be taken into account when deriving the magnitude and direction of the external force from the capacitance measurements. Note that these non-linearities depend on the shape and material properties of the flexible substrate, and on the magnitude and direction of the external force. As a result, different ranges of magnitude of the external force require different implementations of the known force sensor in order to maintain the force sensor's physical integrity. For example, a large enough external force will cause one or more of the displacement electrodes to galvanically contact the fixed electrode, thus providing an electrical short-circuit, or even a physical break-down of the flexible substrate and/or of the fixed substrate. Also note that the material properties depend on the temperature of the flexible substrate, and that the flexing of the flexible substrate generates heat, thus further affecting accuracy of the force measurements.

Accordingly, different ranges of a force to be sensed require different force sensors in practice. A specific force sensor that is used to sense forces, whose magnitudes fall in a specific range, is unsuitable for sensing forces, whose magnitudes are two or more orders of magnitude larger. A first reason for this is that the specific force sensor breaks down as the specific force sensor cannot withstand a much larger force. A second reason is that the sensitivity of each specific force sensor has an upper bound and a lower bound, beyond which the specific force sensor does not supply a reliable sensor signal anymore representative of the force sensed. A third reason is that the accuracy of the sensing mechanism may become unacceptably low beyond the upper bound or the lower bound.

The inventor has realized that it would therefore be commercially advantageous to market or use an accurate and practical force sensor that is made with low-cost, standard commercially available sensor elements, and that is useable for a wide range of magnitudes of a force to be measured.

The inventor therefore proposes a force sensor configured for sensing an external force in at least two dimensions. The force sensor comprises an input part, an intermediate part, a base part and a sensor element. The input part and the base part engage via the intermediate part. The input part has a first end and a second end. The first end of the input part is configured for being subjected to the external force. The sensor element is located between the base part and the second end. The intermediate part engages the input part at a region of the input part at a position between the first end and the second end. The intermediate part is configured to undergo a deformation under combined control of the external force transmitted by the input part to the intermediate part and a reaction force applied by the base part to the intermediate part. The second end of the input part is configured for undergoing a change in at least one of: a position relative to the base part and an orientation relative to the base part in response to the deformation of the intermediate part. The change in at the least one of the position relative to the base part and the orientation relative to the base part is representative of the external force. The sensor element is operative to sense the change and to supply an output signal indicative of the change.

In the invention, the external force to be sensed is converted into a displacement to be sensed by the sensor element. The converting is implemented through a mechanism that involves deforming the intermediate part in response to applying the external force to the first end of the input. The input part, the intermediate part and the base part are configured such that the input part and the base part each deform much less than the intermediate part does at a given external force applied to the first end. The relationship between the external force applied and the resulting displacement is then, for all practical purposes of the force sensor, determined by the elastic properties of the intermediate part, as well as by the length of the lever formed by the portion of the input part between the first end and the region, where the input part engages the intermediate part.

The invention has the following advantages. First, the sensor element is not subjected to the external force proper as exerted on the input part and the reaction forces from the base part. The configuration of the sensor element can therefore be chosen independently of the magnitude of the external force to be sensed. The sensor element may include one or more of the following: a capacitive sensor element, a piezoelectric sensor element, an optical sensor element, an inductive sensor element, etc., to sense the change in position and/or the change in orientation. Second, by means of selecting the elastic properties of the intermediate part relative to the elastic properties of the input part and of the base part, and/or by means of selecting the length of the lever, the same force sensor can be used to sense a wide range of magnitudes of the external force.

Also note that the force sensor of the invention can be used as a torque sensor. For example, assume that the force sensor is configured with the input part in the form of a rigid straight rod. Assume that a torque is applied to the first end in a direction parallel to the main dimension of the rod, i.e., parallel to the axis of the rod. If the rod were free to move, the rod would start to rotate around its axis with an angular acceleration determined by the magnitude of the torque. As a result, the second end would start to rotate with increasing angular velocity relative to the base end. Now, assume that the intermediate part is rigidly attached to the rod as well as to the base part. The intermediate part now starts to apply a reaction torque on the rod at the region of engagement in response to the torque applied at the first end. If the torque at the first end is constant, the input part stops rotating when the reaction torque cancels the torque at the first end. This occurs when the intermediate part has deformed to such an extent, that the internal stresses in the material of the intermediate part provide the reaction torque of the proper magnitude and direction. The second end of the input part has then been displaced in an angular direction relative to the base end. This angular displacement can be measured and is an indicator of the torque applied to the first end. The magnitude of the torque can be determined, e.g., by calibrating the force sensor in advance or by computing if the relevant physical properties of the intermediate part are known in advance.

In above paragraphs, operation of the force sensor has been explained in terms of the external force to be sensed being applied to the first end of the input part and being transmitted to the intermediate part, and in terms of the reaction force exerted by the base and being transmitted to the intermediate part. The base end forms an inertial frame of reference in operational use of the force sensor. It is clear from Newton's third law specifying action and reaction, that the external force to be sensed can, in principle, equally well be applied to the base end, whereupon the input part provides the reaction force.

The sensor element may include one or more of the following: a contactless sensor such as a capacitive sensor, an optical sensor, an inductive sensor, etc., or a contacting sensor such as a piezo-electric sensor, etc. An embodiment of the force sensor in the invention is configured for adjusting the position of the region relative to the second end.

Adjusting the position enables to adjust the length of the lever and, thereby, the sensitivity of the force sensor and/or the range of magnitude of the external force to be sensed. For example, the intermediate part and the input part are configured for adjusting the region of engagement. This may be implemented by means of, e.g., a screw thread tapped into the intermediate part and a corresponding screw thread cut on the input part. As a result, the location of the region of engagement of the input part and the intermediate part can be adjusted by rotating the input part and the intermediate part relative to one another. Other ways are feasible of implementing a continuously adjustable or discretely adjustable engagement of the input part and the intermediate part and are left to the skilled person as design choices.

A further embodiment of the force sensor comprises a limiter that is operative to limit a magnitude of the change in at least one of: the position relative to the base part and the orientation relative to the base part.

The limiter restricts the extent of excursion of the second end relative to the base part. For example, the limiter causes the displacement of the second end relative to the base part and/or the change of orientation of the second end relative to the base part, to remain within range of the sensor element. If the second end leaves the range of the sensor element, the output signal of the sensor element is not representative anymore of the magnitude or of the direction of the external force applied at the first end. As another example, the limiter is configured to restrict the deformation of the intermediate part, e.g., in order to keep the deformation within a parameter domain of the material of the intermediate part, wherein the deformation is elastic.

In a further embodiment of a force sensor in the invention, the intermediate part is removably accommodated at the force sensor.

The configuration of the force sensor according to the invention lends itself to a modular design. If the intermediate part is removably mounted, the intermediate part can be removed and replaced by another removable intermediate part, e.g., in order to adjust the sensitivity of the force sensor by means of using the elastic properties of the other intermediate part that are different from the elastic properties of the removed intermediate part.

The invention also relates to a kit-of-parts comprising an input part, a first component for use as an intermediate part, a base part and a sensor element. The kit-of-parts is configured for assembling a force sensor configured for sensing an external force in at least two dimensions, by means of fitting together the input part, the intermediate part, the base part and the sensor element. The input part and the base part engage via the intermediate part. The input part has a first end and a second end. The first end of the input part is configured for being subjected to the external force. The sensor element is located between the base part and the second end. The intermediate part engages the input part at a region 114 of the input part at a position between the first end and the second end. The intermediate part is configured to undergo a deformation under combined control of the external force transmitted by the input part to the intermediate part and a reaction force applied by the base part to the intermediate part. The second end of the input part is configured for undergoing a change in at least one of: a position relative to the base part and an orientation relative to the base part in response to the deformation of the intermediate part. The change in at least one of the position relative to the base part and the orientation relative to the base part is representative of the external force. The sensor element is operative to sense the change and to supply an output signal indicative of the change.

The kit-of-parts may comprise a second component for use as the intermediate part, wherein the first component and the second component have different elastic properties. Accordingly, the force sensor can be reconfigured for sensing different ranges of magnitudes of the external force. Alternatively, the elastic properties of the first component and of the second component have different directionality. For example, the elastic properties of the first component are spatially isotropic in at least a plane, whereas the elastic properties of the second component are anisotropic in the plane. Accordingly, the force sensor can be reconfigured for isotropic or for anisotropic sensing.

BRIEF DESCRIPTION OF THE DRAWING

The invention is explained in further detail, by way of example and with reference to the accompanying drawing, wherein.

Throughout the Figures, similar or corresponding features are indicated by same reference numerals.

DETAILED EMBODIMENTS

A force sensor according to the invention has an input part, a base part, an intermediate part and a sensor element. The external force to be sensed is applied to the input part. The input part transmits the external force to the base part via the intermediate part. The base part is fixed to a frame of reference and exerts a reaction force on the input part via the intermediate part. The intermediate part deforms as a result of the external force and the reaction force. The deformation of the intermediate part causes the input part to change its position or orientation relative to the base part. The sensor element senses this change and supplied an output signal representative of the change.

Figure 1:
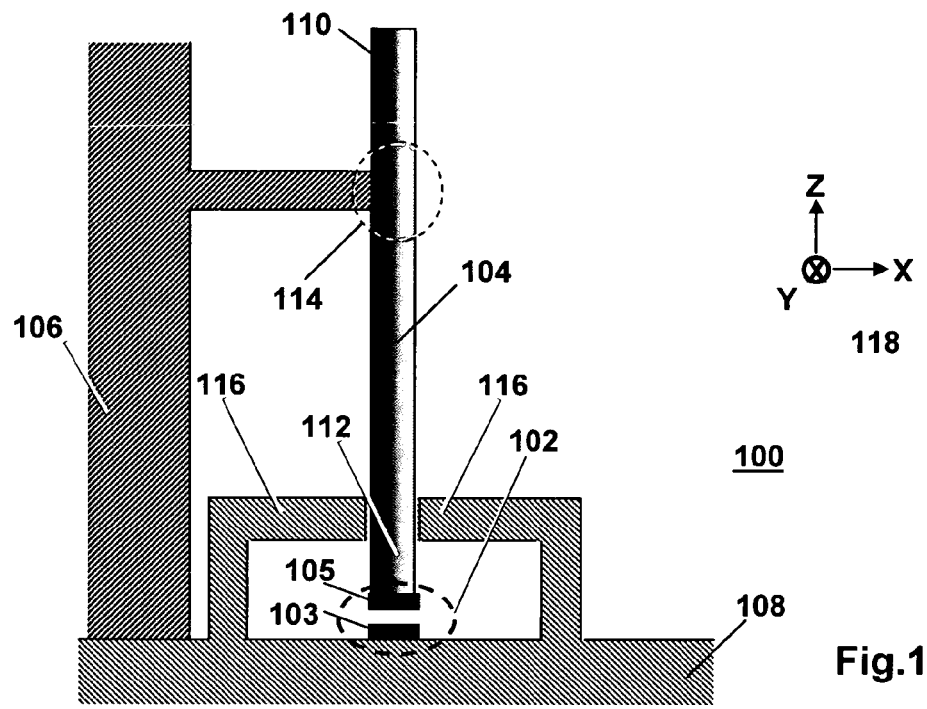
FIGS. 1, 2, 3 and 4 are diagrams of a first force sensor in the invention.

FIG. 1 is a functional diagram of a first force sensor 100 in the invention. The first force sensor 100 is configured for sensing a direction of an external force in at least two dimensions. A force is a vector. A vector has a magnitude and a direction relative to a frame of reference 118, for example, a Cartesian coordinate system with an x-axis, a y-axis and a z-axis. In the example of FIG. 1, the x-axis runs horizontally, the z-axis runs vertically and perpendicularly to the x-axis, and the y-axis runs perpendicularly to the x-axis and to the z-axis.

The first force sensor 100 comprises an input part 104, an intermediate part 106, a base part 108 and a sensor element 102. The position and orientation of the base part 108 remains fixed in the frame of reference 118. The input part 104 and the base part 108 engage via the intermediate part 106. The input part 104 has a first end 110 and a second end 112. The second end 112 is nearer to the sensor element 102 than is the first end 110. The intermediate part 106 engages the input part at a region 114 of the input part 104 at a position between the first end 110 and the second end 112. The sensor element 102 has a first sensor component 103 accommodated at the base part 108 and a second sensor component 105 accommodated at the second end 112 of the input part 104. The sensor element 102 is operative to provide an output signal representative of a change in position of the second end 112 of the input part 104 relative to the base part 108 and/or a change in an orientation of the second end 112 of the input part 104 relative to the base part 108. The change in position and/or orientation of the first sensor component 103 and the second sensor component 105 relative to one another is considered representative of the change in position of the second end 112 of the input part 104 relative to the base part 108 and/or a change in an orientation of the second end 112 of the input part 104 relative to the base part 108.

The sensor element 102 may be implemented in a variety of manners, for example, by means of capacitive measurements as disclosed in U.S. Pat. No. 5,421,213, mentioned above, or by means of optical or magnetic measurements.

Figure 2:
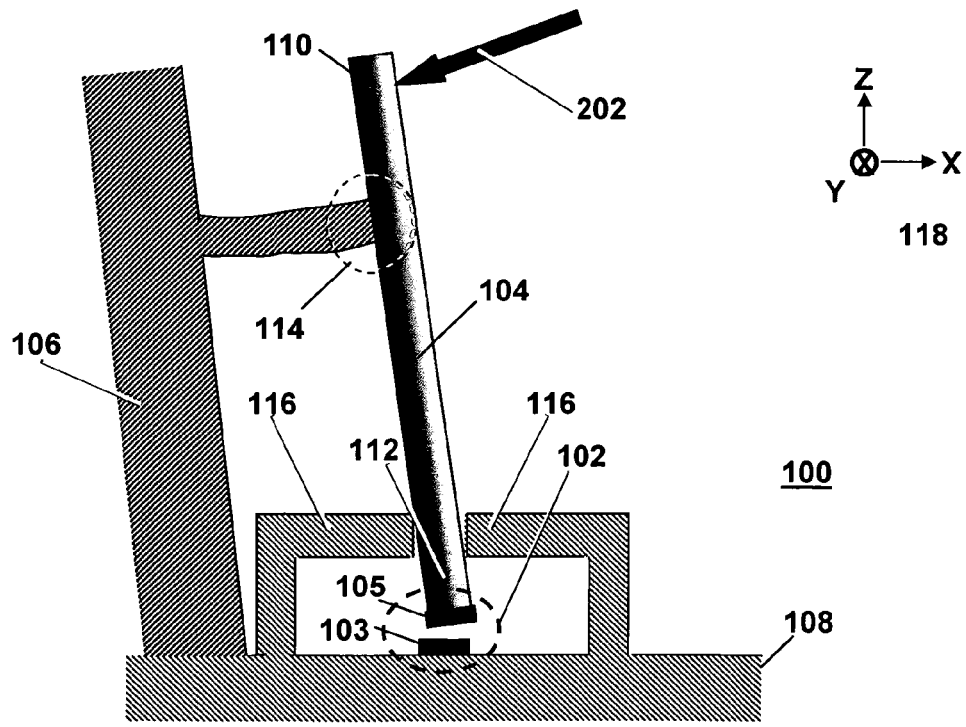

FIG. 2 is a functional diagram of the first force sensor 100 in operational use. If an external force 202 is being applied to the first end 110 of the input part 104, the input part 104 starts to move in the direction of the external force 202. The moving of the input part 104 causes the input part 104 to exert a force on the intermediate part 106 at the region 114, where the input part 104 engages the intermediate part 106. In turn, the intermediate part 106 exerts a force on the base part 108. The base part 108 remains fixed in the frame of reference 118. As a result, the base part 108 starts to exert a reaction force on the intermediate part 106, and the intermediate part 106 transmits the reaction force to the input part 104. The input part 104 stops moving when the vector sum of the external force 202 and the transmitted reaction force equals zero, and when the vector sum of the torque on the input part as a result of the external force 202 and the torque on the input part 104 as a result of the transmitted reaction force equals zero.

All physical objects will deform when being subjected to a force. Accordingly, the input part 104, the intermediate part 106 and the base part 108 all experience deformation when the external force 202 is being applied. In the invention, the intermediate part 106 has been designed to deform much more than each of the input part 104 and the base part 108 under combined control of the external force 202 transmitted by the input part 104 to the intermediate part 106 and the reaction force applied by the base part 108 to the intermediate part 106. Accordingly, the deformation of the intermediate part 106 is considered representative of the external force 202 to be sensed. When the input part 104 has stopped moving, the first force sensor 100 is in mechanical equilibrium. However, the intermediate part 106 is stressed as a result of the deformation. The internal stresses and pressures in the intermediate part 106 serve to apply the proper pressures and tensions to the input part 104 and the base part 108 for the latter to assume mechanical equilibrium.

When the intermediate part 106 deforms, the second end 112 of the input part 104 undergoes a change in a position relative to the base part 108 and/or in an orientation relative to the base part 108. The change in the position relative to the base part 108 and/or the change in orientation relative to the base part 108 is representative of the deformation of the intermediate part 106 and, therefore, of the external force 202. The sensor element 102 is operative to sense the change and to supply an output signal indicative of the change, and therefore of the external force 202.

The extent of deformation of the intermediate part 106 determines the change in position of the second end 112 relative to the base part 108 and/or the change in orientation of the second end 112 relative to the base part 108. Accordingly, the elastic properties of the intermediate part 106 relative to the elastic properties of the input part 104 and of the base part 108 determine the range of magnitudes of the external force 202 that can be sensed.

The sensor element 102 is configured to sense a displacement of the second end 112 relative to the base part 108 and/or or a change in orientation of the second end 112 relative to the base part 108 in one, two or three dimensions. Such sensor elements are well known in the art, and their functioning is based on, capacitive measurements, inductive measurements, optical measurements, etc.

Assume that the input part 104 is suspended from the intermediate part 106, as shown in the functional diagrams of FIGS. 1 and 2, and that the first end 110 is free to move in two dimensions, i.e., in a plane spanned by the x-axis and the y-axis, under application of the external force 202 and the reaction force of the base part 108 transmitted to the input part 104 via the intermediate part 106. Under such conditions, the combined forces and torques as experienced by the input part 104 may send the second end 112 well out of reach of the range wherein the sensor element 102 provides a meaningful output signal. Alternatively, the magnitudes of the forces and torques experienced by the intermediate part 106 may well cause the deformation of the intermediate part 106 to leave the domain, wherein the deformation is elastic. Therefore, the first force sensor 100 is suitably provided with a first limiter 116. The first limiter 116 serves to limit a magnitude of the maximum excursion of the second end 112 relative to the base part 108 and/or to limit the orientation that the second end 112 can assume relative to the base part 108 in response to a horizontal external force 202. That is, once the external force 202 has assumed a threshold magnitude in a particular direction, the first limiter 116 exerts a reaction force and a reaction torque on the input part 104 that are much larger than the reaction force and reaction torque exerted by the (now deformed) intermediate part 106 on the input part 104. As a result, the input part 104 stops moving much sooner than in the absence of the limiter 116, thus keeping the deformation of the intermediate part 106 within the domain wherein the deformation is elastic, and thus keeping the second end 112 of the input part 104 within a spatial region wherein the sensor element 102 supplies a meaningful output signal.

In the diagrams of FIGS. 1 and 2, the first component 103 and the second component 105 of the sensor element are located in such positions that a large enough vertical downward external force on the first end 110 (i.e., in the negative direction of the z-axis in the frame of reference 118) will drive the second end 112 against the base part 108, thus exposing the sensor element 102 to forces that occur in the first force sensor 100.

Figure 3:
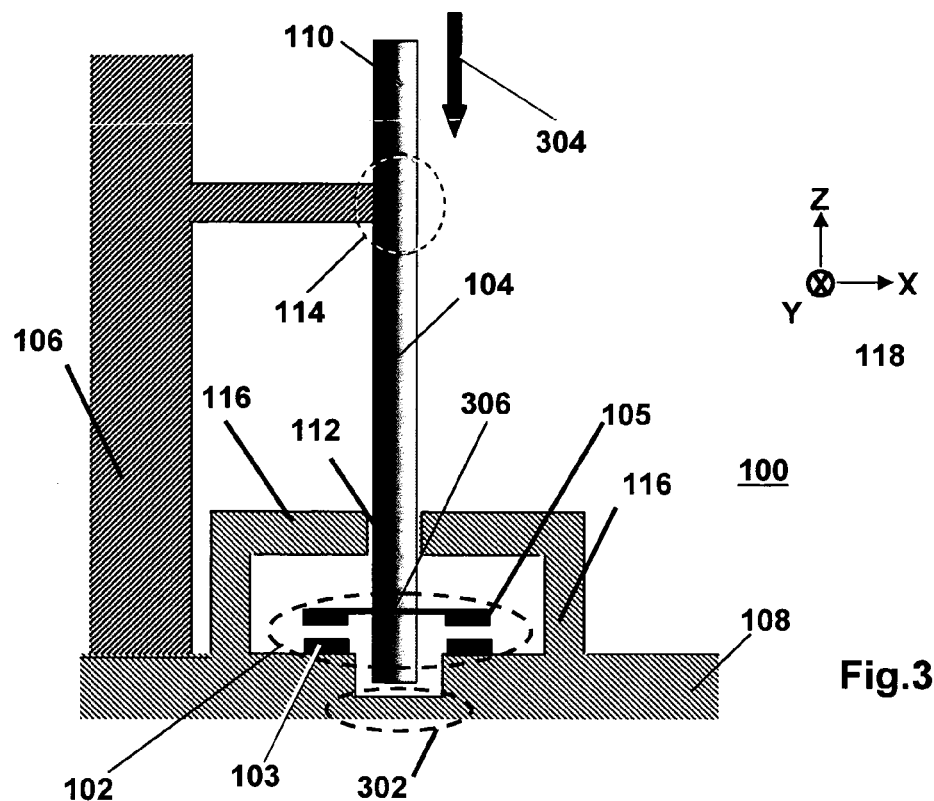

FIG. 3 is a functional diagram of the first force sensor 100 provided with an example of a second limiter 302. The second limiter 302 serves to limit the vertical excursion of the second end 112 of the input part 104 when a substantially vertical force 304 is applied to the first end 110 of the input part 104. A region 302 at the base part 108 forms the second limiter 302, stopping further vertical movement of the input part 104 when the second end 112 of the input part 104 abuts the base part 108 in the region 302. The first component 103 of the sensor element 102 and the second component 105 of the sensor element 105 are accommodated out of harm's way. The first component 103 is located on the base part 108 next to the region 302, and the second component 105 is accommodated on a horizontal support 306 attached to, or forming a physically integral portion of, the second end 112. The maximum vertical displacement in the direction of the negative z-axis, allowed by the second limiter 302, is smaller than the vertical distance between the first component 103 and the second component 105 in the absence of an external force on the first end 110.

The horizontal support 306 may also be used to limit the vertical displacement of the input part 104 in the positive direction of the z-axis. In this case, the horizontal support 306 abuts the first limiter 116 at the end of its vertical upwards travel, thus restricting the deformation of the intermediate part 106 when an external force is applied in the vertical upward direction.

Limiters for limiting the displacement of the second end 112 relative to the base part 108 and/or the orientation of the second end 112 relative to the base part 108 may be implemented in a variety of other manners and depend on design choice. For example, a vertical limiter may be implemented by means of increasing the horizontal thickness of the input part 104 at either side of the first limiter 116 that serves to limit, among other things, the horizontal displacement of the second end 112 relative to the base part 108.

The functional diagram of FIG. 1 illustrates the functionality of the first force sensor 100. The actual configuration of the first force sensor 100 providing this functionality depends on design choices and may vary per field of application. For example, the first force sensor 100 has a configuration that is asymmetrical in the direction of the x-axis. That is, if an external force applied to the first end 110 has a vector component along the x-axis in the negative direction (i.e., to the left in the drawing), the intermediate part 106 is at least partly compressed and bends in the negative direction. If the external force applied to the first end 110 has a positive vector component along the x-axis (i.e., to the right in the drawing), the intermediate part 106 is at last partly under tension and bends to the right. The elastic behavior of the intermediate part 106 under compression may be different from the elastic behavior of the intermediate part 106 under tension. Such a configuration may be useful, e.g., for sensing external forces lying substantially in the plane spanned by the x-axis and the z-axis and having a vector component along the x-axis that has constant polarity.

Figure 4:
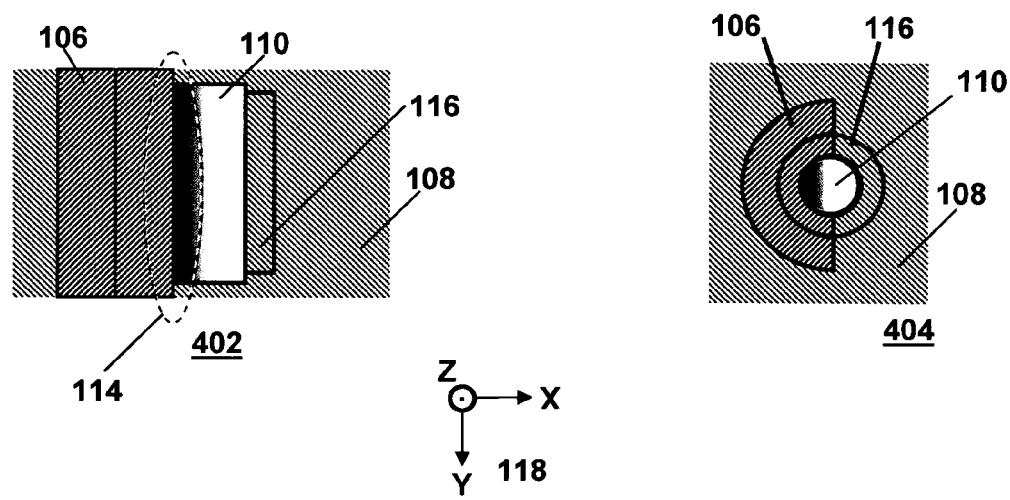

FIG. 4 is a diagram showing a top view of a topology of a first implementation 402 of the first force sensor 100, and a top view of a topology of a second implementation 404 of the first force sensor 100, when viewed from above parallel to the z-axis and in the negative direction. In the first implementation 402 of the first force sensor 100, the first end 110 of the input part 104, the intermediate part 106 near the region 114, and the first limiter 116 are shaped as respective rectangles, for measuring external forces, whose vectors lie predominantly in a plane spanned by the x-axis and the z-axis, and whose vector component along the x-axis has a negative polarity. In the second implementation 404 of the first force sensor 100, the first end 110 of the input part 104, the intermediate part 106 near the region 114 (not indicated here in order to not obscure the drawing), and the first limiter 116 are shaped as respective ring segments, for measuring external forces, whose vector component along the x-axis has a negative polarity.

Figure 5:
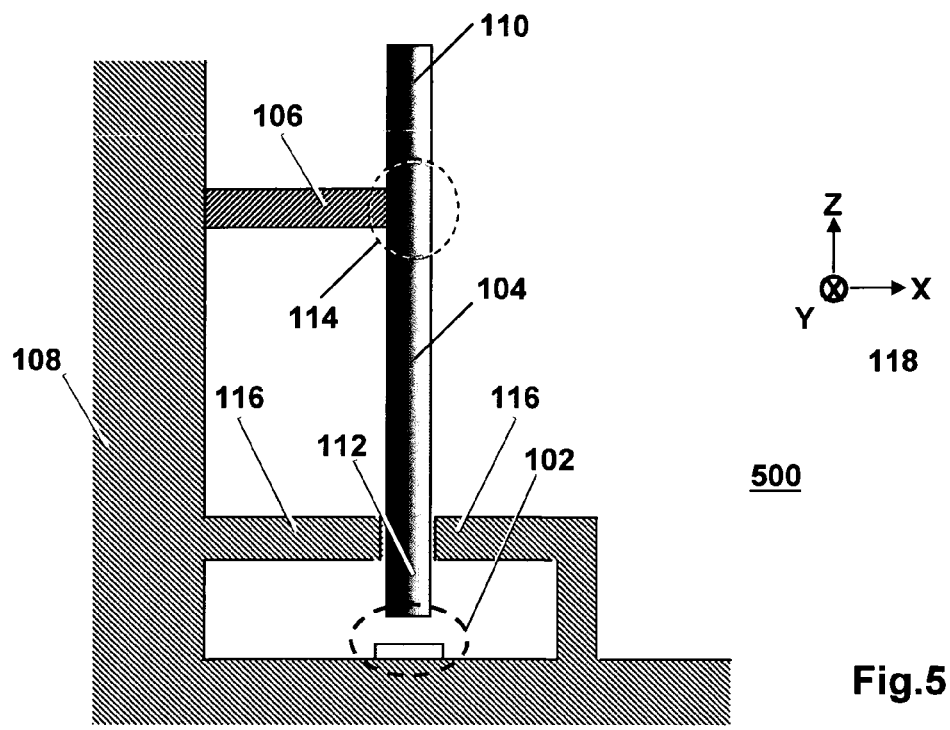
FIGS. 5 and 6 are diagrams of a second force sensor in the invention.

FIG. 5 is a functional diagram of a second force sensor 500 that is a variation on the theme of the first force sensor 100 of FIGS. 1, 2, 3 and 4. In the second force sensor 500, the intermediate part 106, i.e., the physical component of the force sensor that is being subjected to deformation, is limited to a connection between the input part 104 and the base part 108 that runs substantially horizontally, i.e., in a plane spanned by the x-axis and the y-axis. In the first force sensor 100, the deformation of the intermediate part 106, which occurs in response to the external force applied to the first end 110, is distributed over a relatively large volume of an intricate three-dimensional shape. In the second force sensor 500 the deformation of the intermediate part 106, occurring as a result of the external force applied to the first end 110, is distributed over a much smaller volume of a relatively simple shape. An advantage of the configuration of the second force sensor 500 over the configuration of the first force sensor 100, is that the intermediate part 106 in the second force sensor is subjected, in first order, to only compression or tension in a horizontal plane, spanned by the x-axis and the y-axis, in response to an external force lying in the horizontal plane. In the first force sensor 100, the intermediate part 106 will also be subjected to bending where the intermediate part 106 meets the base part 108. As known, bending of a piece of material brings about compression on one side of the neutral line or neutral plane, and tension on the other side of the neutral line or neutral plane. The neutral line and the neutral plane indicate a virtual line and a virtual plane, respectively, in the piece of material, whose dimensions (e.g., length) do not change under bending. The elastic behavior of the intermediate part 106 in the second force sensor 500 therefore enables a simple linear relationship between the external force applied to the tip end 110 and the resulting deformation of the intermediate part 106.

Figure 6:
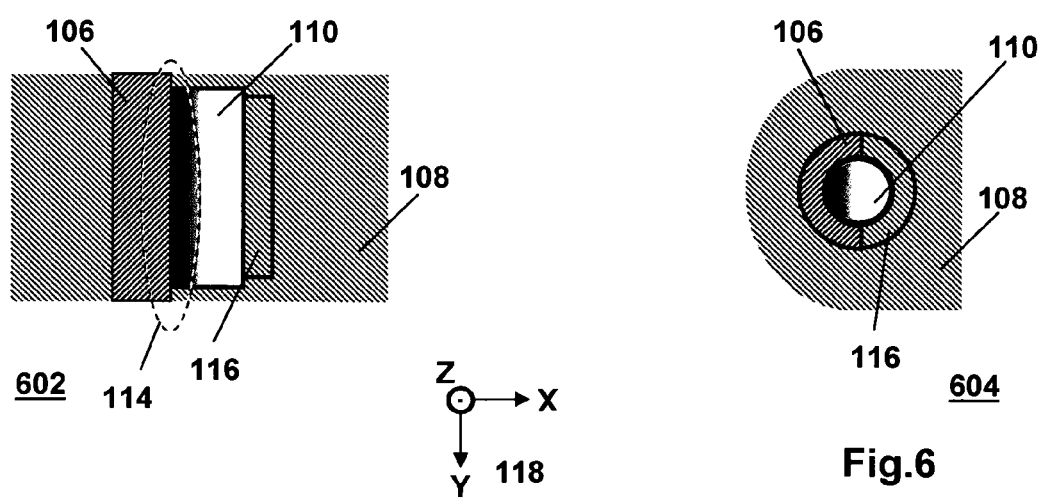

FIG. 6 is a diagram showing a top view of a topology of a first implementation 602 of the second force sensor 500, and a top view of a topology of a second implementation 604 of the second force sensor 500, when viewed from above parallel to the z-axis and in the negative direction. In the first implementation 602 of the second force sensor 500, the first end 110 of the input part 104, the intermediate part 106, and the first limiter 116 are shaped as respective rectangles, for measuring external forces, whose vectors lie predominantly in a plane spanned by the x-axis and the z-axis, and whose vector component along the x-axis has a negative polarity. In the second implementation 604 of the second force sensor 500, the input part 104, the intermediate part 106, and the first limiter 116 are shaped as respective ring segments, for measuring external forces, whose vector component along the x-axis has a negative polarity.

Figure 7:
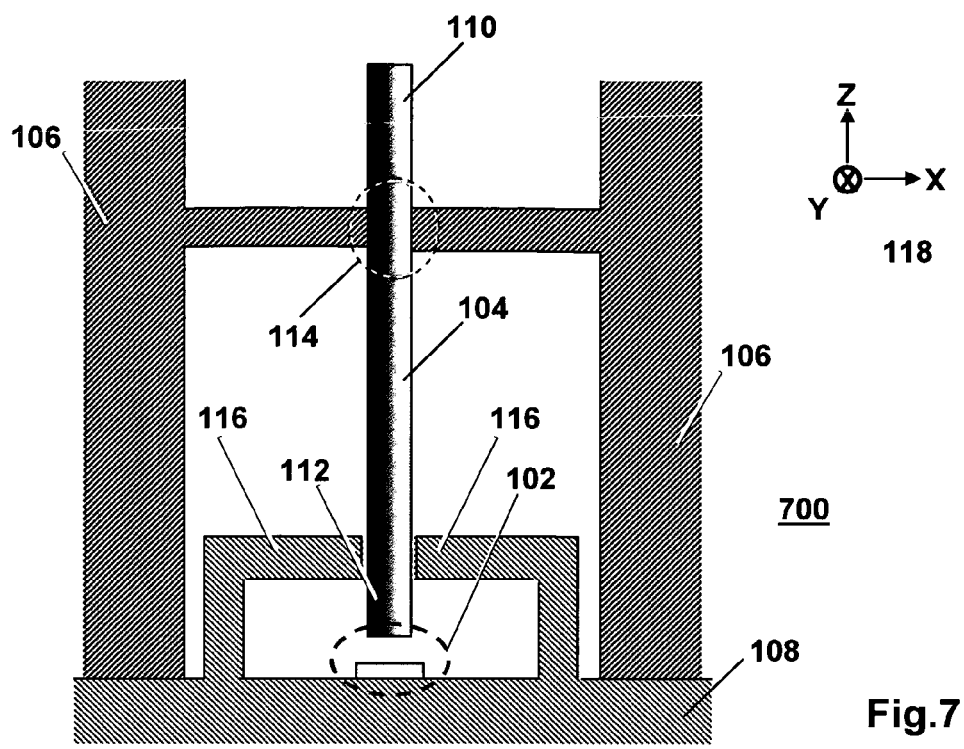
FIGS. 7 and 8 are diagrams of a third force sensor in the invention.

FIG. 7 is a functional diagram of a third force sensor 700 that is a variation on the theme of the first force sensor 100. In the third force sensor 700, the intermediate part 106 is formed by an arrangement that is symmetric with regard to the input part 104.

Figure 8:
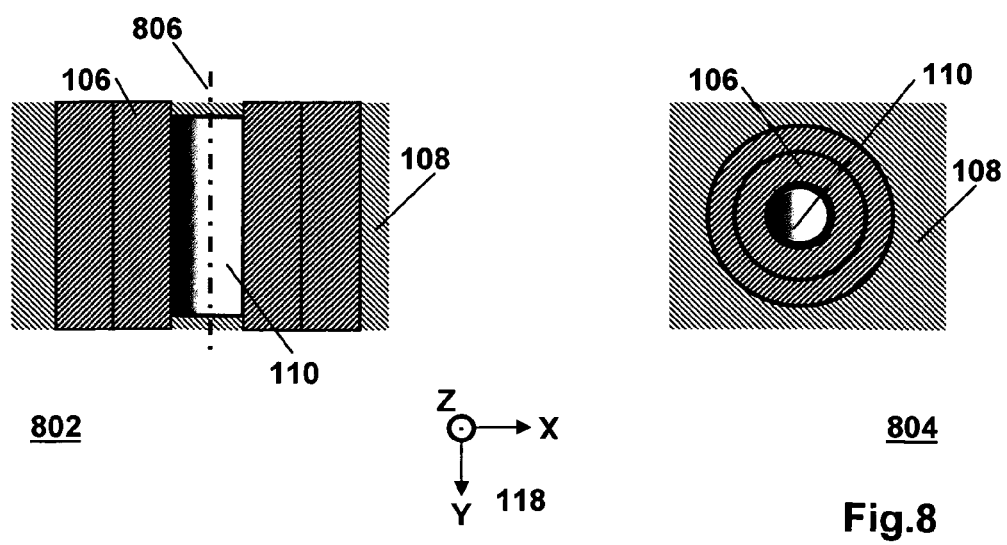

FIG. 8 is a diagram showing a top view of a topology of a first implementation 802 of the third force sensor 700, and a top view of a topology of a second implementation 804 of the third force sensor 700, when viewed from above parallel to the z-axis and in the negative direction.

The first implementation 802 of the third force sensor 700 has a mirror-symmetry with regard to a plane 806 through the input part 104 and parallel to the y-axis and to the z-axis. Near the region 114, the input part 104 may then be a rectangular slab of material having a height along the z-axis and a width along the y-axis that are substantially larger than the thickness along the x-axis. The first implementation 802 of the third force sensor 700 is configured for sensing external forces that lie substantially in a plane spanned by the x-axis and the z-axis. An external force with a vector component along the y-axis causes compression, tension and shear in the material of the intermediate part 106. The configuration of the first implementation 802 of the third force sensor 700 gives rise to a complicated relationship between, on the one hand, the external force and, on the other hand, the resulting deformation and the reaction force of the intermediate part 106, depending on the elasticity, actual shape and dimensions of the intermediate part 106.

The mirror-symmetry of the first implementation 802 of the third force sensor 700 ensures that the relationship between, on the one hand, the deformation of the intermediate part 106 and, on the other hand, the external force causing the deformation, has a mirror-symmetry as well. For example, an external force with a vector parallel to the x-axis and of a specific polarity brings about a deformation of the intermediate part 106 that is mirror symmetrical with respect to another deformation of the intermediate part 106 brought about by another external force parallel to the x-axis and of the opposite polarity.

The second implementation 804 of the third force sensor 700 has rotational symmetry around the longitudinal axis (not shown) of the input part 104 that runs parallel to the z-axis. In the second implementation 804 of the third force sensor 700, the input part 104, the intermediate part 106, and the first limiter 116 have circular-symmetrical shapes for measuring external forces that may assume any direction.

The rotational symmetry of the second implementation 804 of the third force sensor 700 ensures that the relationship between, on the one hand, the deformation of the intermediate part 106 and, on the other hand, the external force causing the deformation, has a rotational symmetry as well. For example, consider applying a first external force to the first end 110 that brings about a first deformation of the intermediate part 106. Now, rotate the first external force, applied to the first end 110, over a certain angle around the z-axis in order to obtain a second external force. The second external force gives rise to a second deformation of the intermediate part 106. The second deformation equals the first deformation after being rotated over the same angle around the z-axis.

Figure 9:
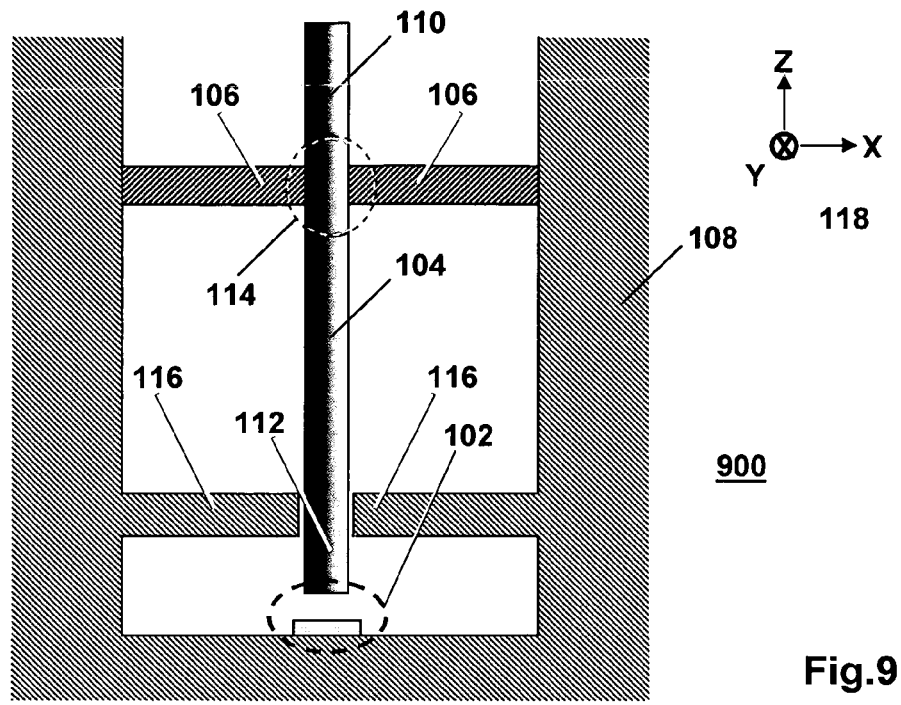
FIGS. 9 and 10 are diagrams of a fourth force sensor in the invention.

FIG. 9 is a functional diagram of a fourth force sensor 900 that is a variation on the theme of the second force sensor 500. In the fourth force sensor 900, the intermediate part 106 is formed by an arrangement that is symmetric with regard to the input part 104.

Figure 10:
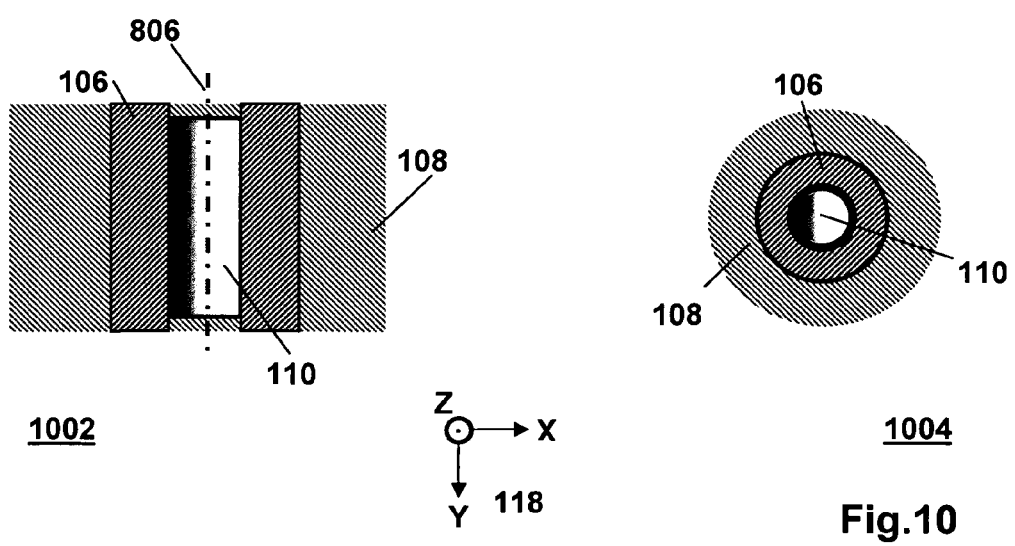

FIG. 10 is a diagram showing a top view of a topology of a first implementation 1002 of the fourth force sensor 900, and a top view of a topology of a second implementation 1004 of the fourth force sensor 900, when viewed from above parallel to the z-axis and in the negative direction.

The first implementation 1002 of the fourth force sensor 900 has a mirror-symmetry with regard to the plane 806 through the input part 104 and parallel to the y-axis and to the z-axis. The input part 104 may then be a rectangular slab of material having a height along the z-axis and a width along the y-axis that are substantially larger than the thickness along the x-axis. The first implementation 1002 of the fourth force sensor 900 is configured for sensing external forces that lie substantially in a plane spanned by the x-axis and the z-axis. Consider an external force with a vector component along the y-axis. Such an external force causes compression, tension and shear in the material of the intermediate part 106. The configuration of the first implementation 1002 of the fourth force sensor 900 gives rise to a complicated relationship between, on the one hand, the external force and, on the other hand, the resulting deformation and the reaction force of the intermediate part 106, depending on the elasticity, actual shape and dimensions of the intermediate part 106.

The mirror-symmetry of the first implementation 1002 of the fourth force sensor 900 ensures that the relationship between, on the one hand, the deformation of the intermediate part 106 and, on the other hand, the external force causing the deformation, has a mirror-symmetry as well. For example, an external force with a vector parallel to the x-axis and of a specific polarity brings about a deformation of the intermediate part 106 that is mirror symmetrical with respect to another deformation of the intermediate part 106 brought about by another external force parallel to the x-axis and of the opposite polarity.

The second implementation 1004 of the fourth force sensor 900 has rotational symmetry around the longitudinal axis (not shown) of the input part 104 that runs parallel to the z-axis. In the second implementation 1004 of the fourth force sensor 900, the input part 104, the intermediate part 106, and the first limiter 116 are have circular-symmetrical shapes for measuring external forces that may assume any direction.

The first force sensor 100, the second force sensor 500, the third force sensor 700 and the fourth force sensor 900 each have their own advantages and disadvantages and their individual usage may depend on the directional character of the external force to be sensed.

As is clear, the functionality of the second limiter 306 in the first force sensor 100 of FIG. 3 can be transplanted to the second force sensor 500, the third force sensor 700 and to the fourth force sensor 900 straight away.

Consider the second force sensor 500 and the fourth force sensor 900, wherein the intermediate part 106 runs substantially parallel to the horizontal plane spanned by the x-axis and the y-axis and couples the input part to a substantially vertical wall of the base part 108. The relationship between the external force applied to the first end 110 and the resulting deformation of the intermediate part 106 is then, for all practical purposes, determined by the elastic properties of the intermediate part 106, as well as by the length of the lever formed by the portion of the input part 104 between the first end 110 and the region 114, where the input part 104 engages the intermediate part 106. Assume that the location of the intermediate part 106, relative to the first end 110 is adjustable, while the horizontal orientation of the intermediate part 106 is maintained. Then, the length of the lever, formed by the portion of the input part 104 between the first end 110 and the region 114, is adjustable and, therefore, the deformation of the intermediate part 106 and the reaction force on the input part 104. Accordingly, by adjusting the position of the intermediate part 106 in the second force sensor 500 or in the fourth force sensor 900, the sensitivity to the external force can be adjusted.

Figure 11:
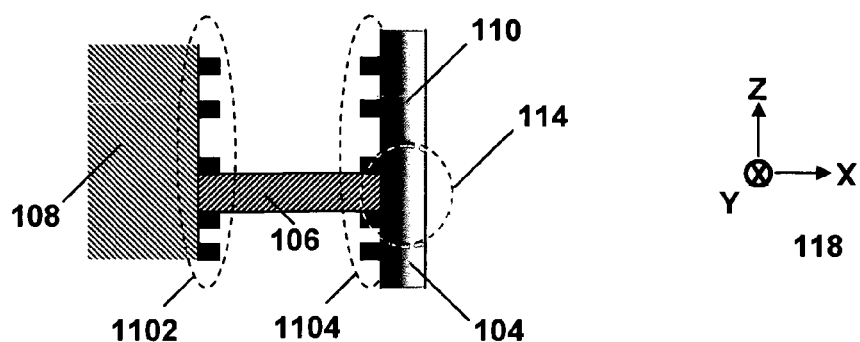
FIGS. 11, 12 and 13 are diagrams illustrating configurations of the second force sensor with adjustable sensitivity.
Figure 12:
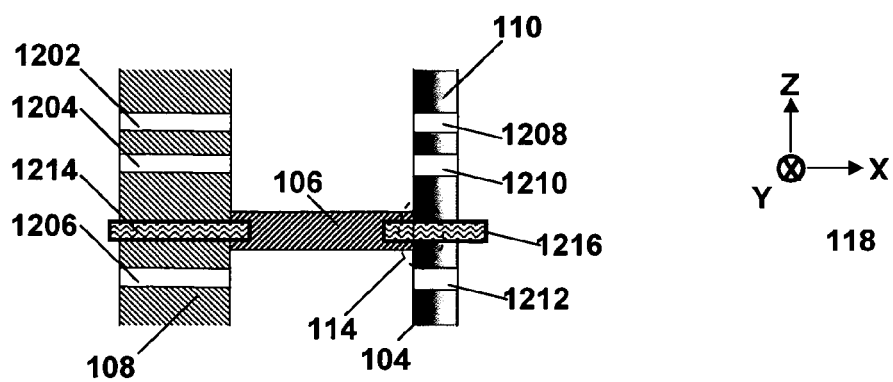
Figure 13:
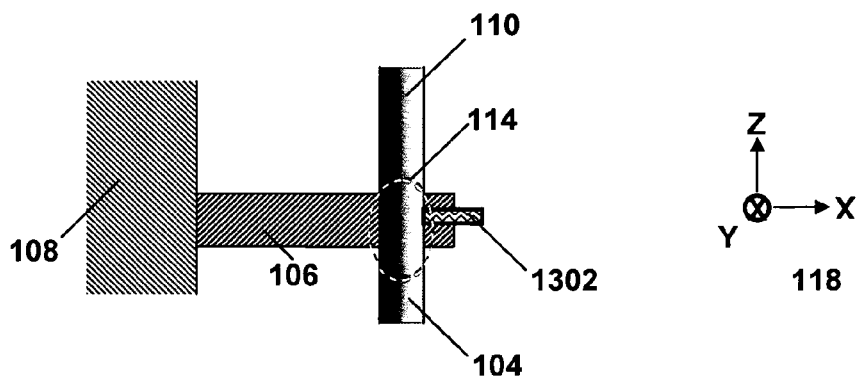

FIGS. 11, 12 and 13 give some examples of ways to configure the second force sensor 500 for adjustable sensitivity. The examples are just to illustrate adjusting the sensitivity by means of repositioning the intermediate part 106 relative to the input part 104, and the examples are not to be interpreted as limiting the scope of the invention. Other adjusting means are feasible, as will be clear to the skilled person.

FIG. 11 is a diagram of a cross-section of a portion of the second force sensor 500. The position of the intermediate part 106 in the second force sensor 500 of FIG. 11 is made adjustable by means of providing a vertical wall of the base end 108 with a vertical stack 1102 of horizontally running ridges, and providing another vertical stack 1104 of horizontally running other ridges on the input part 104. The intermediate part 106 is positioned between a vertically adjacent pair of the ridges and a vertically adjacent pair of the other ridges. Repositioning of the intermediate part 106 is feasible by means of leaning the input part 104 away from the vertical wall of the base part 108. In this case, the second force sensor 500 is suitable for sensing forces FIG. 12 is another diagram of a cross-section of a portion of the second force sensor 500. The position of the intermediate part 106 in the second force sensor 500 of FIG. 12 is made adjustable by means of providing a vertical wall of the base part 108 with one or more vertical arrangements of through-holes, and providing the input part 104 with one or more vertical arrangements of other through-holes, and fixing the position of the intermediate part 106 by means of a bolt or a pin stuck through a specific one of the through-holes into the intermediate part 106, and another bolt or another pin stuck through a specific one of the other through-holes and into the intermediate part 106. In the cross-section of FIG. 12, a first through-hole 1202, a second through-hole 1204 and a third through-hole 1206 are indicated in the vertical wall of the base part 108, and a first other through-hole 1208, a second other through-hole 1210 and a third other through-hole 1212 are indicated in the input part 104. A bolt 1214 is stuck through a fourth through-hole (not labeled) and screwed into the intermediate part 106. Another bolt 1216 is stuck through a fourth other through-hole (not labeled) and screwed into the intermediate part 106. Repositioning the intermediate part 106 is brought about by unscrewing the bolt 1214 and the other bolt 1216, removing the bolt 1214 and the other bolt 1216, repositioning the intermediate part 106 so as to line up with another pair of a through-hole and another through-hole, e.g., the first through-hole 1202 and the first other through-hole 1208, sticking the bolt into the first through-hole 1202 and the other bolt into the first other through-hole 1208, and tightening the bolt 1214 and the other bolt 1216.

FIG. 13 is yet another diagram of a cross-section of a portion of the second force sensor 500. The position of the intermediate part 106 in the second force sensor 500 of FIG. 13 is made adjustable by means of having the intermediate part 106 enclosing the input part 104 in the region 114 with a tight sliding fit that enables the intermediate part 106 to be slid up or down the input part 104 in a direction parallel to the z-axis for adjusting the position of the intermediate part 106 relative to the input part 104, and to stay in place in operational use of the second force sensor 500. In operational use of the second force sensor 500, the intermediate part 106 abuts the vertical wall of the base part 108 without being attached to the based part 104. If desired a locking mechanism, e.g., a locking screw 1302, is provided to lock the intermediate part 106 in place.

Figure 14:
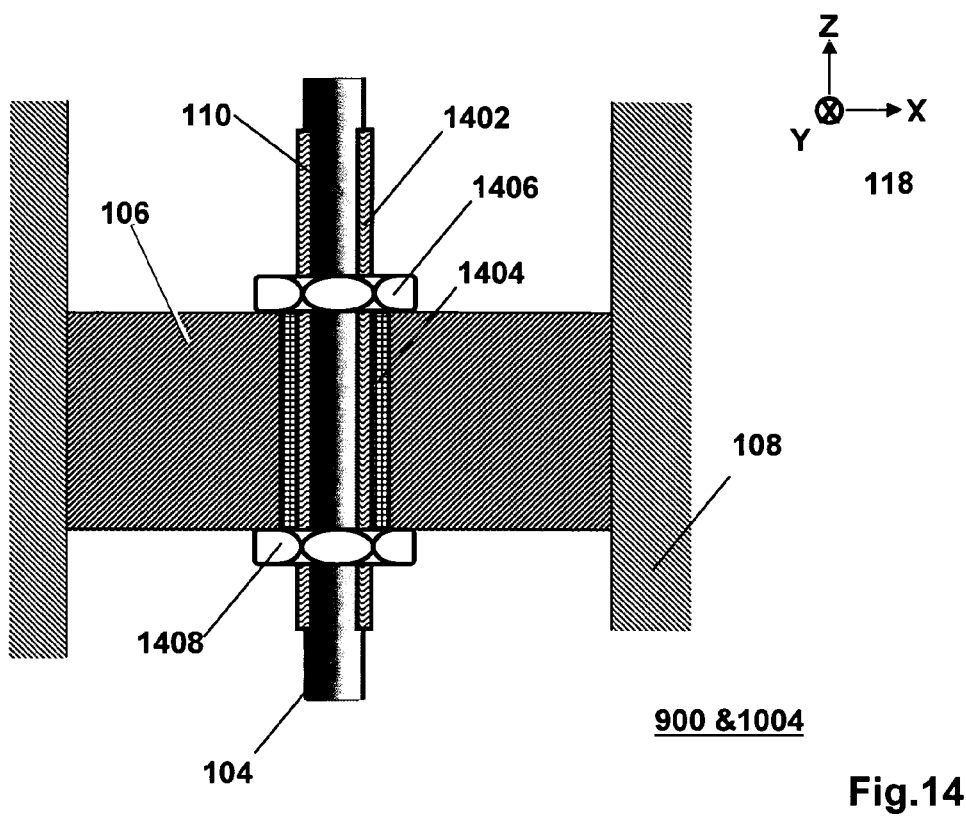
FIG. 14 is a diagram diagrams illustrating configurations of the second force sensor with adjustable sensitivity.

FIG. 14 gives an example of a manner to configure the fourth force sensor 900 for adjustable sensitivity. The example is just to illustrate adjusting the sensitivity by means of repositioning the intermediate part 106 relative to the input part 104, and the example is not to be interpreted as limiting the scope of the invention. Other adjusting means are feasible, as will be clear to the skilled person.

FIG. 14 is a diagram of a cross-section of a portion of the second implementation 1004 of the fourth force sensor 900. The second implementation 1004 of the fourth force sensor 900 has a rotationally symmetrical configuration with respect to the longitudinal axis of the input part 104. The position of the intermediate part 106 is made adjustable relative to the input part 104 by means of a screw thread 1402 cut on the input part 104 and a corresponding screw thread 1404 tapped into a center hole of the disk-shaped intermediate part 106. The position of the intermediate part 106 can therefore be adjusted relative to the input part 104 by means of rotating the intermediate part 106 relative to the input part 104. In operational use of the fourth force sensor 900 of FIG. 14, the intermediate part 106 abuts the vertical wall of the base part 108 without being attached to the based part 104. The intermediate part 106 can be locked in place, e.g., by means of a first lock nut 1406 and a second lock nut 1408.

The diagrams of FIGS. 11, 12, 13 and 14 illustrate ways to adjust the sensitivity of a force sensor according to the invention by means of adjusting a position of the intermediate part 106 relative to the input part 104. Another way of adjusting the sensitivity is to replace the intermediate part 106, accommodated in the force sensor, by another intermediate part 106 that has elastic properties different from the ones of the intermediate part 106 accommodated in the force sensor. The elastic properties of the intermediate part 106 depend on the physical material of the intermediate part 106, on the actual shape of the intermediate part 106, and on the dimensions of the intermediate part 106. Accordingly, the force sensor of the invention, e.g., the second force sensor 500 or the fourth force sensor 900, could be marketed as a kit-of-parts, the kit comprising the input part 104, the base part 108 and the sensor element 102 as well as one or more intermediate parts 106. If multiple intermediate parts 106 are provided in the kit, different ones of the intermediate parts have different elastic properties. This kit enables to build a force sensor for a particular one of different ranges of external forces to be sensed by means of using a particular one of the multiple intermediate parts 106 included in the kit. Yet another way of adjusting the sensitivity is using a combination of multiple intermediate parts 106 in the force sensor of the invention, functionally arranged in parallel between the input part 104 and the base part 108. By means of varying the number of intermediate parts 106 in the force sensor, different ranges of the external forces can be sensed.

Figure 15:
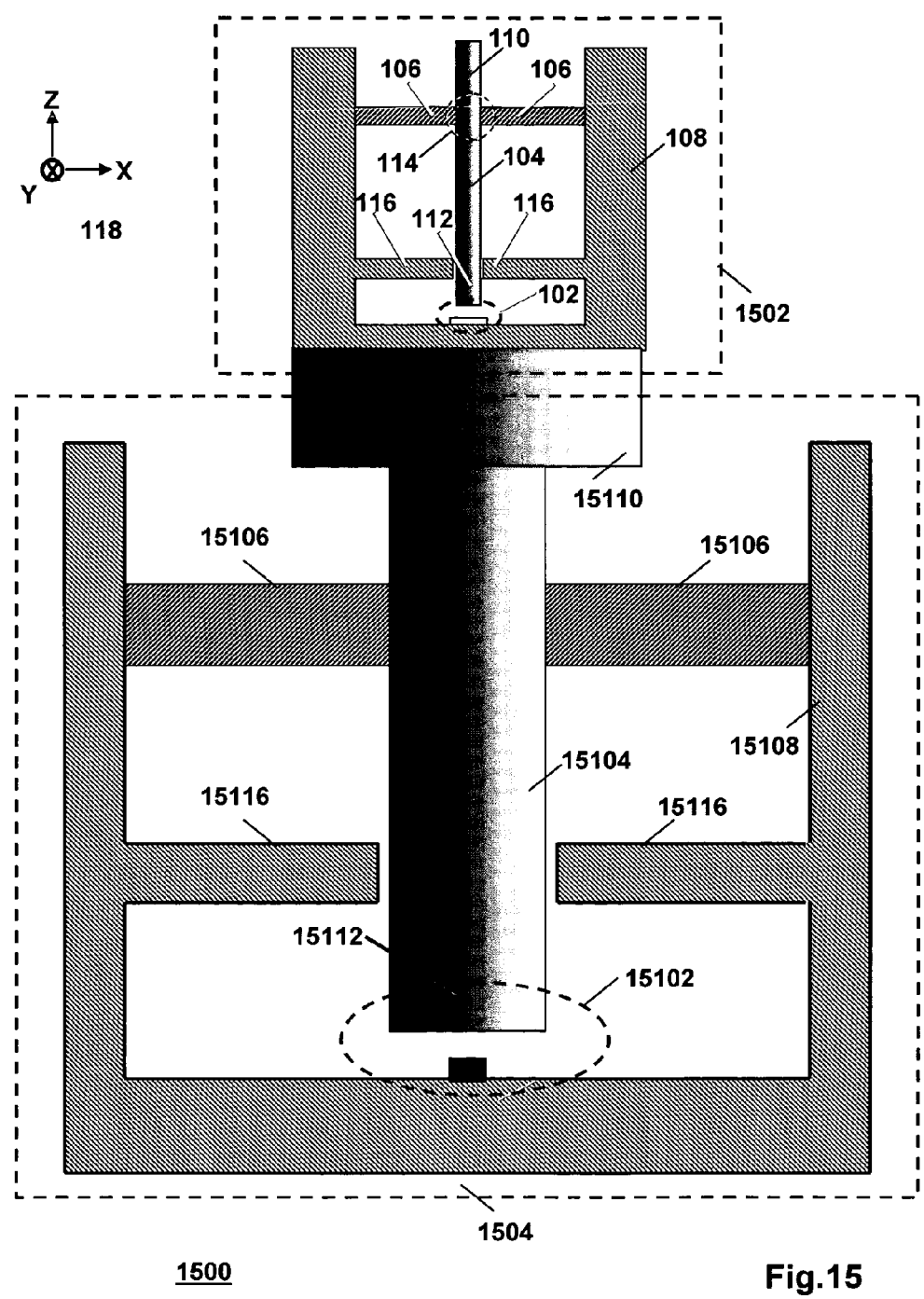
FIG. 15 is a diagram of a fifth force sensor in the invention.

FIG. 15 is a diagram illustrating an example of a fifth force sensor 1500 according to the invention. The fifth force sensor 1500 comprises a hierarchy of multiple force sensors according to the invention can be nested within one another. In order to not obscure the drawing, a first-level force sensor 1502 and a second-level force sensor 1504 are illustrated. The first-level force sensor 1502 comprises the fourth force sensor 900 discussed above with reference to FIG. 9. The second-level force sensor 1504 is modeled after the fourth force sensor 900 of FIG. 9. That is, respective ones of the components of the fourth force sensor 900, discussed above, correspond to respective ones of the other components of the second-level force sensor 1504 as illustrated in FIG. 15. Accordingly, the second-level force sensor 1504 comprises: a second-level sensor element 15102 corresponding to the sensor element 102; a second-level input part 15104 corresponding to the input part 104; a second-level intermediate part 15106 corresponding to the intermediate part 106, a second-level base part 15108 corresponding to the base part 108; a second-level first end 15110 corresponding to first end 110; a second-level second end 15112 corresponding to second end 112; and a second-level first limiter 15116 corresponding to the first limiter 116.

In the fourth force sensor 900, the intermediate part 106 is formed by an arrangement that is symmetric with regard to the input part 104. In the fifth force sensor 1500, the intermediate part 106 of the first-level force sensor 1502 is formed by an arrangement that is likewise symmetric with regard to the input part 104 of the first-level force sensor 1502 and, similarly, the second-level intermediate part 15106 of the second-level force sensor 1504 is likewise formed by another arrangement that is symmetric with regard to the second-level input part 15104 of the second-level force sensor 1504.

The first-level force sensor 1502 is attached to the second-level first end 15110 of the second-level input part 15104 of the second-level force sensor 1504. The elastic properties of the intermediate part 106 of the first-level force sensor 1502 and the elastic properties of the second-level intermediate part 15106 of the second-level force sensor 1504 are chosen such that the second-level intermediate part 15106 of the second-level force sensor 1504 starts to deform when the first limiter 116 of the first-level force sensor 1502 becomes operational and starts preventing further deformation of the intermediate part of the first-level force sensor 1502. The external force applied to the input part 104 of the first-level force sensor 1502 is then transmitted to the second-level input part 15104 of the second-level force sensor 1504 via the limiter 116 and the base part 108 of the first-level force sensor 1502.

Note that the sensitivity of a force sensor according to the invention, e.g., the third force sensor 700, the fourth force sensor 900 or the fifth force sensor 1500, need not be isotropic in the sense of, e.g., being uniform in the horizontal plane spanned by the x-axis and the y-axis. As to the third force sensor 700 and the fourth force sensor 900, the intermediate part 106 may have been configured to have anisotropic elastic properties, for example, so as to have a higher sensitivity to a vector component of the external force along the x-axis and a lower sensitivity to another vector component of the same external force along the y-axis. Such a configuration may come in handy when the magnitude of the vector component of the external force in a direction parallel to the x-axis is expected to be lower than the magnitude of the other vector component of the same external force in a direction parallel to the y-axis. Similarly, the configuration of the fifth force sensor 1500 may be used to sense external forces of small magnitude with the first-level force sensor 1502 in, e.g., the x-direction, and to sense external forces of high magnitude in the y-direction through the second-level force sensor 1504.

The invention claimed is:

1. A force sensor configured for sensing an external force in at least two dimensions, wherein:
the force sensor comprises an input part, an intermediate part, a base part-and a sensor element;
the input part and the base part engage via the intermediate part;
the input part has a first end-and a second end;
the first end of the input part is configured for being subjected to the external force;
the sensor element is located between the base part and the second end;
the intermediate part engages the input part at a region of the input part at a position between the first end and the second end;
the intermediate part is configured to undergo a deformation under combined control of the external force transmitted by the input part to the intermediate part and a reaction force applied by the base part to the intermediate part;
the second end of the input part is configured for undergoing a change in at least one of: a position relative to the base part and an orientation relative to the base part in response to the deformation of the intermediate part;
the change in at least one of the position relative to the base part and the orientation relative to the base part is representative of the external force;

the sensor element is operative to sense the change and to supply an output signal indicative of the change.

2. The force sensor of claim 1, configured for adjusting the position of the region relative to the second end.

3. The force sensor of claim 1, comprising a limiter that is operative to limit a magnitude of the change in at least one of:
the position relative to the base part, and
the orientation relative to the base part.

4. The force sensor of claim 1, wherein the intermediate part is removably accommodated at the force sensor.

5. A kit-of-parts, comprising an input part, a first component for use as an intermediate part, a base part-and a sensor element; wherein:
the kit-of-parts is configured for assembling a force sensor configured for sensing an external force in at least two dimensions, by means of fitting together the input part, the intermediate part, the base part and the sensor element;
the input part and the base part engage via the intermediate part;
the input part has a first end and a second end;
the first end of the input part is configured for being subjected to the external force;
the sensor element is located between the base part and the second end;
the intermediate part engages the input part at a region of the input part at a position between the first end and the second end;
the intermediate part is configured to undergo a deformation under combined control of the external force transmitted by the input part to the intermediate part and a reaction force applied by the base part to the intermediate part;
the second end of the input part is configured for undergoing a change in at least one of: a position relative to the base part and an orientation relative to the base part in response to the deformation of the intermediate part;
the change in at least one of the position relative to the base part and the orientation relative to the base part is representative of the external force;
the sensor element is operative to sense the change and to supply an output signal indicative of the change.

6. The kit-of-parts of claim 5, comprising a second component for use as the intermediate part, wherein the first component and the second component have different elastic properties.

7. The force sensor of claim 2, comprising a limiter that is operative to limit a magnitude of the change in at least one of: the position relative to the base part and the orientation relative to the base part.

8. The force sensor of claim 7, wherein the intermediate part is removably accommodated at the force sensor.

9. The force sensor of claim 2, wherein the intermediate part is removably accommodated at the force sensor.

10. The force sensor of claim 3, wherein the intermediate part is removably accommodated at the force sensor.

* * * * *